United States Patent [19]

Moses

[11] 4,138,207
[45] Feb. 6, 1979

[54] TIRE RETREAD MATRIX REGISTER ASSEMBLY

[75] Inventor: Charles L. Moses, Barberton, Ohio

[73] Assignee: Intercole Automation, Inc., Wadsworth, Ohio

[21] Appl. No.: 860,593

[22] Filed: Dec. 14, 1977

[51] Int. Cl.² .............................................. B29H 5/04
[52] U.S. Cl. ...................................... 425/19; 425/23; 425/25
[58] Field of Search ........................ 425/17, 19, 20, 21, 425/22, 23, 24, 25, 43, 39, 46, 47

[56] References Cited

U.S. PATENT DOCUMENTS

| | | | |
|---|---|---|---|
| 2,854,692 | 10/1958 | Robbins | 425/24 |
| 3,337,918 | 8/1967 | Pacciarini et al. | 425/39 |
| 3,701,615 | 10/1972 | Johnson | 425/23 |
| 3,778,203 | 12/1973 | MacMillan | 425/20 |
| 3,990,821 | 11/1976 | MacMillan | 425/19 |
| 4,022,554 | 5/1977 | MacMillan | 425/23 |
| 4,025,250 | 5/1977 | MacMillan | 425/17 |
| 4,029,448 | 6/1977 | MacMillan | 425/43 X |

Primary Examiner—J. Howard Flint, Jr.
Attorney, Agent, or Firm—Oldham, Oldham, Hudak & Weber

[57] ABSTRACT

The assembly includes a sidewall and bead plate ring mounted on a lower bladder hub plate in a press to extend generally radially therefrom for engaging the lower half of a retread matrix which is centered thereby, and a matrix register and centering ring is provided for attachment to the lower press platen after being moved into centering engagement with the lower matrix half whereby the matrix half can be removed from engagement with the said centering ring and then be replaced in centered relationship to the press by engagement with the centering ring.

5 Claims, 3 Drawing Figures

TIRE RETREAD MATRIX REGISTER ASSEMBLY

BACKGROUND OF INVENTION

At the present time, there are some tire retread presses in use commercially wherein the presses involve one fixed platen and a movable lower platen positioned for movement on a vertical axis in relation to the upper platen, and two bladder hub plates are present in the press and movable independently on vertical axes for use in tire retread operations.

In some of these presses, the retread matrix has not been insulated very well from the platen surfaces and this has caused relatively inefficient operation and use of the retread presses, and also certain of such presses have not had any satisfactory devices provided therein for centering measurements and adjustments have been required in these retread presses and this has made changing molds in the retread presses slow, inefficient operations.

OBJECTS OF THE INVENTION

The general object of the present invention is to provide improved apparatus for retread presses wherein retread matrices can be readily centered in the press by use of a matrix centering ring provided for the press.

Another object of the invention is to provide tire retread apparatus with positive centering and locating means for the matrix by mechanical interengaging spacing and locating actions and by use of complementary shaped members such as tapered shoulders on adjacent surfaces of a lower half of the matrix and a matrix register plate and centering ring secured to the lower press platen.

Another object of the invention is to use localized spacer bars and means for spacing the retread matrix from associated press platens to aid in insulating the matrix from the press platen and reduce heat flow therebetween.

A further object of the invention is to provide apparatus that can be easily and readily operated by factory personnel to locate and center matrices in retread presses and to permit removal of the matrix from a press and replacement of the matrix in the press in centered relation thereto.

The foregoing and other objects and advantages of the invention will be made more apparent as the specification proceeds.

Attention now is particularly directed to the accompanying drawings, wherein.

When referring to corresponding members shown in the drawings and referred to in the specification, corresponding numerals are used to facilitate comparison therebetween.

INVENTIVE SUBJECT MATTER

Figure 1:
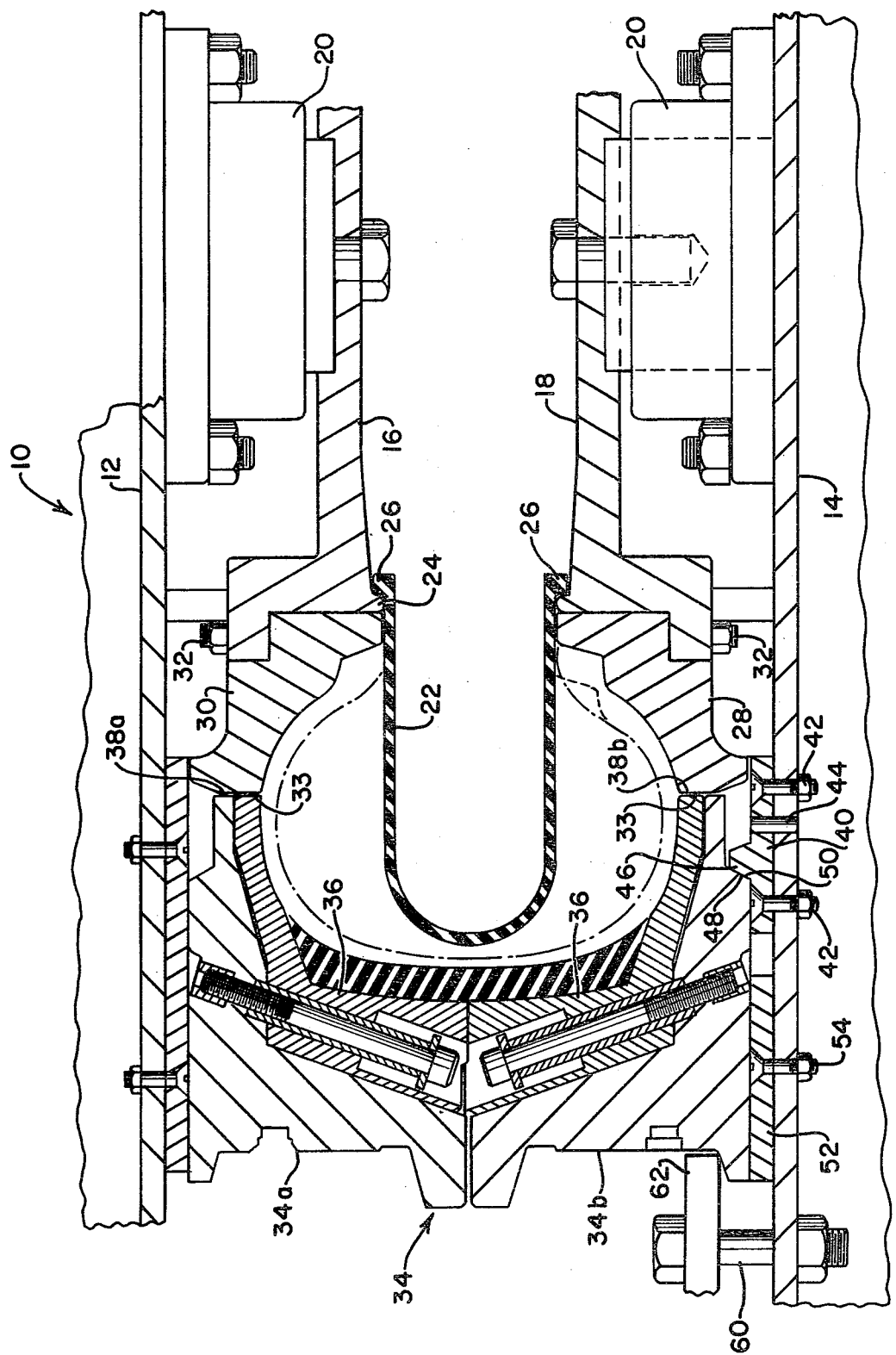
FIG. 1 is a vertical section of a portion of a tire retread apparatus with a matrix and matrix centering means positioned therein and embodying the principles of the invention.
Figure 2:
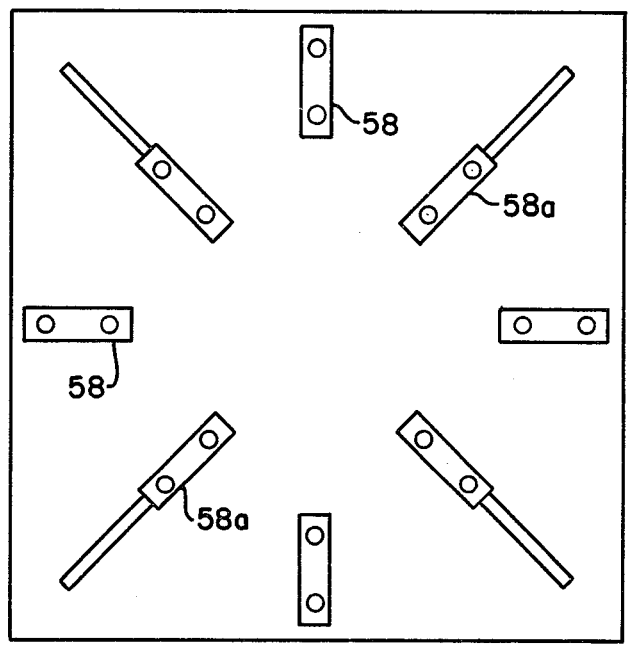
FIG. 2 is a bottom plan view of the upper platen in the press with spacer means affixed thereto.
Figure 3:
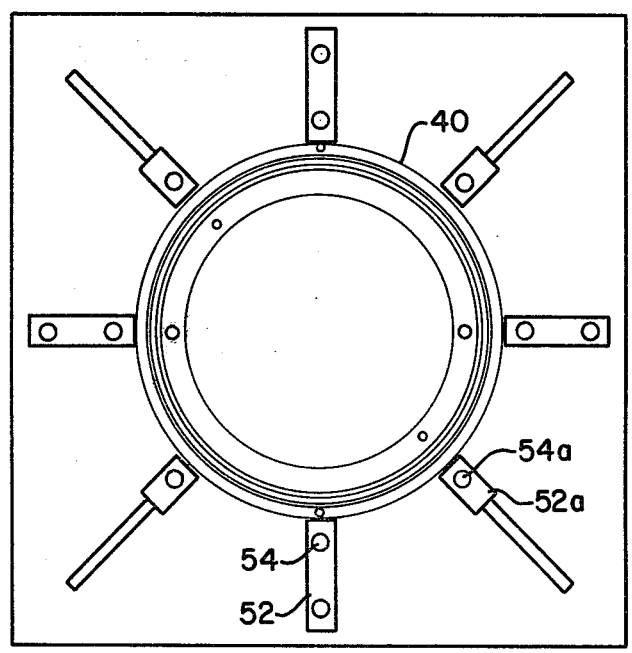
FIG. 3 is a top plan of the lower platen of the press with spacer means and a matrix centering ring affixed thereto.

The present invention, as one embodiment thereof, relates to a matrix register assembly for tire retread operations for use with a combination including a press having upper and lower press platens and upper and lower independently movable bladder hub plates and a matrix having upper and lower matrix halves, the matrix register assembly comprising a sidewall and bead plate ring adapted to engage the lower bladder hub plate and be secured thereto to extend radially therefrom, the lower matrix half being adapted to engage the radially outer end of such sidewall and bead plate ring to be centered in the press thereby, the matrix having an annular centering member on its lower surface, and a matrix register and centering ring having an upstanding annular centering member thereon, which centering members have complementary surfaces thereon for engaging each other to center the second named ring in the press, which matrix register and centering ring is thereafter secured to the lower press platen. The invention further provides metal spacer members for engaging localized or spaced portions of the upper and lower press platens and spaced localized areas of the upper and lower matrix halves for spacing and insulating the matrix from the press platens.

Attention now is directed to the details of the structures shown in the accompanying drawings, and a tire retread press is indicated as a whole by the numeral 10 and with only small surface portions of an upper press platen 12 and the lower press platen 14 being shown. The press is of conventional construction and means (not shown) are provided for moving at least one of these press platens 12 or 14 on a vertical axis for matrix and press opening and closing action. The press 10 also includes an upper bladder hub or plate 16 and a lower bladder hub or plate 18. Normally, both of these bladder hubs or plates 16 and 18 are independently movable on vertical axes by conventional means such as cylinders or other equivalent members 20 operatively connecting thereto to aid in tire retread operations. A typical or conventional bladder 22 is shown positioned in engagement with radially outer flanges 24 on the hub plates by flanged edges 26 on the bladder. Conventional means (not shown) connect to the enclosure formed by the bladder hubs or plates 16 and 18 and the bladder 22 for inflating the bladder for tire retread operation, as desired.

The invention, as an important feature thereof, provides sidewall and bead plate rings 28 and 30 that are secured, respectively, to the lower hub plate 18 or the upper bladder hub plate 16 by bolts 32. FIG. 1 of the drawings shows that these rings 28 and 30 extend radially outwardly of the press and terminate in substantially axially directed surfaces 33, which surfaces are centered in relation to the hub plates 16 and 18 because of the fixed engagement of the rings to the hub plates. Thus, a matrix 34 comprising an upper half 34a and a lower matrix half 34b can be and is operatively secured to and carried in the press 10 for tire retread action. The matrix 34 may be of any known construction and that one shown includes spring loaded segmented inserts or shoes 36 positioned in the matrix in a conventional manner for forming the desired tread contour on the tires retreaded in the apparatus of the invention. Any desired heating means are operatively connected to the matrix 34.

The matrix halves 34a and 34b each terminate in substantially axially directed surfaces 38a and 38b, respectively, at their radially inner edges and these surfaces 38a and 38b engage with the generally axially extending surfaces 33 of the sidewall and bead plate rings. Hence, a mechanical engagement is provided between the matrix, and through the rings 28 and 30 to the hubs or plates 16 and 18 and a positive centering or locating action for the matrix 34 is obtained.

In order to permit the matrix 34 to be removable in relation to the press and still obtain the desired centering action readily, a matrix register and centering ring 40 is provided in the apparatus. This ring 40 is adapted to be and normally is carried on and secured to the lower press platen 14 as by bolts 42 or centering roll pins 44 extending between the ring 40 and the lower press platen. The matrix register and centering ring has an upstanding annular rib 46 provided thereon that engages a companion centering member on the lower press platen. That member comprises a tapered or beveled or lower edge 50, which edge or shoulder is complementary to the companion centering member and by tapering this edge 50 and one edge of the rib 46 and engaging such edges, a positive centering or locating action between the lower mold or matrix half and the centering ring 40 is facilitated.

The matrix 34 is spaced from the upper and lower press platens by spacer members or plates with spacer plates 52 and 52a being on the lower press platen and secured thereto by bolts 54 and 54a. The spacer plates 52 and 52a, in combination with the matrix locating and centering ring 40 engage the lower matrix half and space it from the lower press platen to reduce heat loss from the matrix to the press and increase efficiency of the retread operation.

Likewise, metal spacer members 58 and 58a are suitably secured to spaced parts of the upper press platen for engaging localized areas at circumferentially spaced portions of the upper matrix half to position such matrix in spaced relation from the upper press platen. This insulates the upper matrix half from the press and reduces heat transfer therebetween.

When setting up or positioning the apparatus of the invention, the following steps are normally required:

Initially the lower matrix register and centering ring 28 is secured to the lower bladder hub 18, and such hub is raised to its inoperative or elevated position. Then the lower mold half 34a is placed on the lower press platen, and normally the spacers 5 are already thereon, and the lower bladder hub plate 18 is carefully and/or slowly brought back to operative position when manually moving the lower matrix half or adjusting its position so that the adjacent surfaces 33 and 38b of the two members slidably telescope together whereby a positive mechanical locating or centering action for the lower matrix half is readily obtained. Next, the matrix register and centering ring 40, previously applied to the lower press platen at the center area thereof, is adjusted to be certain that the complementary centering members or means on this ring 40 and the lower matrix half (surfaces 48 and 50) are properly operatively engaged with each other whereby the ring 40 is positively and mechanically centered in the press. At that time, usually the lower hub plate 18 is elevated and an operator can reach the ring 40 for drilling or forming centering holes therein and place centering roll pins, for example, in the ring 40 to locate it positively on the lower press platen. Also, if necessary, the lower matrix half is elevated without moving the ring 40 from its centered position and then suitable holes are drilled in the lower press platen and lower ring for receiving the bolt and centering means extending therebetween and positively positioning this centering ring in fixed centered position in the press. Thereafter, the entire matrix 34 can be moved into and out of the press for tire retreading or tire stripping actions and the matrix can be repositioned in the press in positively centered relationship thereto.

The matrix also is physically secured to the lower press platen in any conventional manner, as by bolts 60 and attachment fingers or clamps 62 as indicated in FIG. 1.

The drawing indicates a tire carcass diagrammatically to which a tire retread, shown in vertical section, is being secured.

In general, the invention has provided novel mechanical centering means and locating members for use in tire tread presses. The centering action for the retread matrix has been simplified and improved by positive easily controlled and set engaging means. Furthermore, the efficiency of heating in the tire retread press has been improved and the objects of the invention have been achieved.

While one complete embodiment of the invention has been disclosed herein, it will be appreciated that modification of this particular embodiment of the invention may be resorted to without departing from the scope of the invention.

I claim:

1. A matrix register assembly for tire retread apparatus in a combination including upper and lower matrix halves, a press having upper and lower press platens and upper and lower bladder hub plates, one of said press platens being movable on a vertical axis and where said assembly comprises a sidewall and bead plate ring for engaging the lower bladder hub plate and extending radially outwardly thereof, said lower matrix half is adapted to engage the radially outer end of said ring to be centered thereby, said matrix having an annular centering member on its lower surface, and a matrix register and centering ring having an upstanding annular centering member thereon, said centering members having complementary surfaces thereon for engaging each other to center said second named ring in said press, and means for securing said centering ring to said lower press platen.

2. A matrix register assembly as in claim 1 where said complementary surfaces are continuous and are inclined to a vertical axis.

3. A matrix register assembly as in claim 1 where metal spacer means are provided to engage spaced portions of each of said press platens and space said matrix therefrom.

4. A matrix register assembly for tire retread apparatus in a combination including a press having upper and lower press platens and upper and lower independently movable bladder hub plates, one of said press platens being movable on a vertical axis and said bladder hub plates being movable on a vertical axis and comprising a sidewall and bead plate ring secured to the lower bladder hub plate and extending radially outwardly therefrom and having a radially outer end, a matrix including a lower matrix half engaging the radially outer end of said ring by a radially inner end of said matrix half to be centered thereby, said matrix having an annular shoulder on its lower surface adjacent a radially inner portion thereof, and a matrix register and centering ring having an upstanding annular rib thereon, said annular shoulder and rib having complementary tapered surfaces thereon engaging each other to center said matrix register and centering ring, means securing said centering ring to said lower press platen, and spacer plates on said lower platen to engage spaced portions of said matrix half, said matrix half being supported on said matrix register and centering ring and spacer plates, said matrix half being removable and being replaceable on said matrix register and centering ring in centered relation to said bladder hub plate.

5. A matrix register assembly as in claim 4 where an upper matrix half is spaced from said upper press platen by additional spacer plates engaging localized areas of said upper matrix half.

* * * * *